United States Patent [19]

Gunzner et al.

[11] 4,055,204

[45] Oct. 25, 1977

[54] ADJUSTABLE WOBBLE DADO ASSEMBLY HAVING IMPROVED DYNAMIC BALANCE

[75] Inventors: Fred G. Gunzner, Colton; Dale Edwards, Oregon City; John A. Lanning, Mulino, all of Oreg.

[73] Assignee: Lifetime Carbide Company, Colton, Oreg.

[21] Appl. No.: 743,686

[22] Filed: Nov. 22, 1976

[51] Int. Cl.[2] .................... B23C 1/02

[52] U.S. Cl. .................... 144/238; 90/11 A; 407/31

[58] Field of Search .................... 90/11 A; 144/238, 239; 29/103 R, 104, 105 R

[56] References Cited

U.S. PATENT DOCUMENTS

| | | | |
|---|---|---|---|
| 682,810 | 9/1901 | Parks | 144/238 |
| 716,094 | 12/1902 | Peoples | 144/238 |
| 2,286,633 | 6/1942 | McCabe | 29/104 |
| 2,458,216 | 1/1949 | Spindt | 144/238 |
| 2,544,814 | 3/1951 | Warren | 144/238 |
| 2,665,722 | 1/1954 | Edgemond, Jr. | 144/238 |
| 2,922,449 | 1/1960 | Sam | 144/238 |
| 3,172,437 | 3/1965 | Hansen | 29/104 X |
| 3,848,512 | 11/1974 | Erhardt | 144/238 |

*Primary Examiner*—Othell M. Simpson
*Assistant Examiner*—W. D. Bray
*Attorney, Agent, or Firm*—Chernoff & Vilhauer

[57] ABSTRACT

An adjustable wobble dado assembly having a plate-like circular blade, a pair of inner plate members fixedly mounted on either side of the blade having generally parallel outer surfaces and complementary inner surfaces for holding the blade at an inclined position relative to the outer surfaces, and a pair of interconnected outer plate members on either side of the inner plate members having parallel outer surfaces and complementary inner surfaces inclined relative to the outer surfaces and bearing rotatably against the inner plate members. Each inner plate member has an inwardly tapering central aperture for rotatably receiving a respective cylindrical hub of an outer plate member. Each cylindrical hub extends along an axis perpendicular to the outer surface, rather than the inclined inner surface, of the outer plate member, such axis also being coincident with the axis of an arbor bore extending through the hub. The outside surfaces of the hubs, if tapered at all, are not tapered to the same degree as the central bores of the inner plate members, so that upon relative rotation of the blade and inner plate members relative to the outer plate members, the central bores tilt with respect to the hubs as though moving about a fulcrum. The inner and outer plate members are formed of a material having a greater specific gravity than the material of the circular blade so as to maximize the concentration of mass near to the arbor axis of rotation.

4 Claims, 7 Drawing Figures

FIG. 1
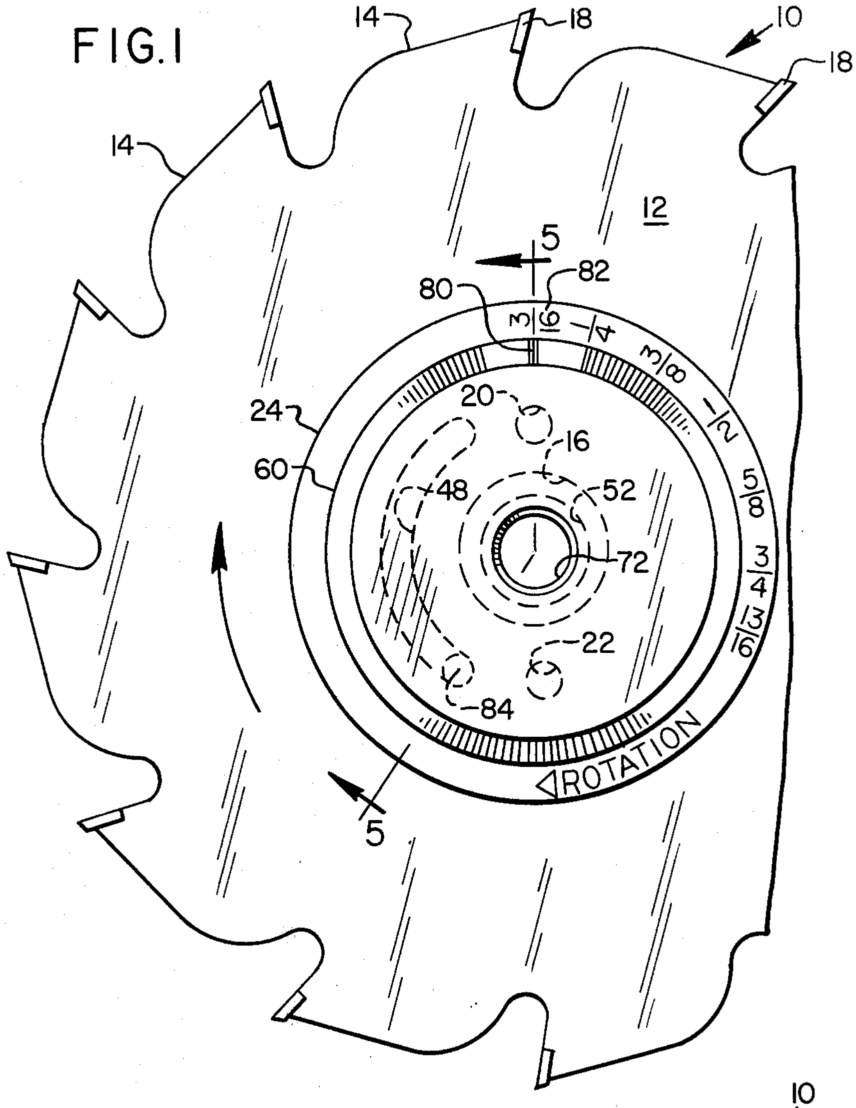
FIG. 2
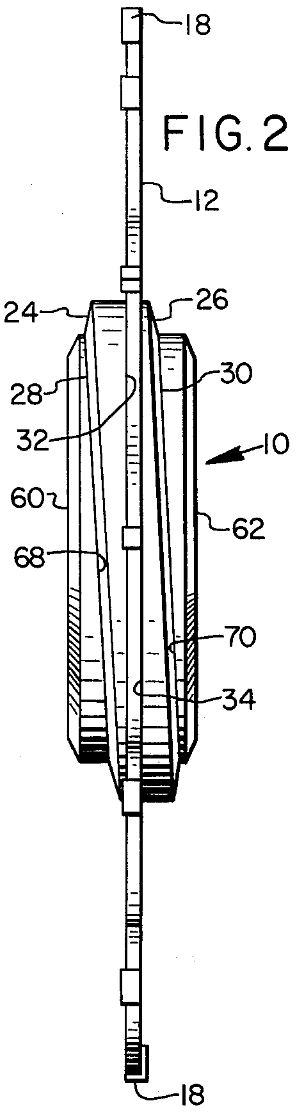
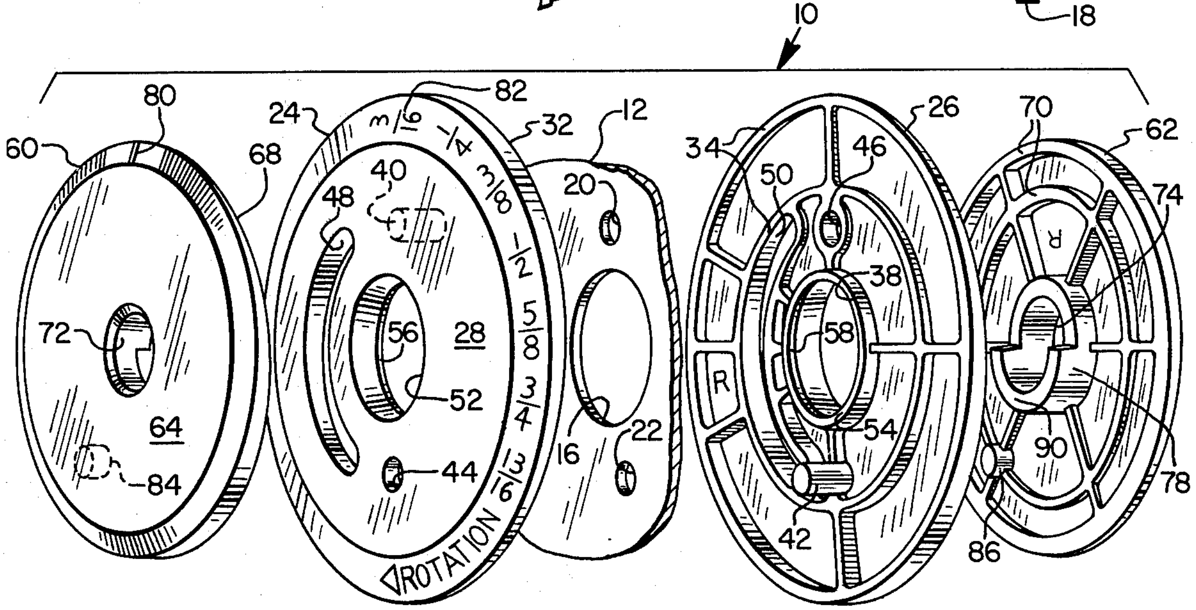
FIG. 3

ADJUSTABLE WOBBLE DADO ASSEMBLY HAVING IMPROVED DYNAMIC BALANCE

BACKGROUND OF THE INVENTION

This invention relates to improvements in wobble dado assemblies whereby adjustable means are provided for tilting a circular cutting blade at various angles with respect to an arbor so as to utilize the blade to cut grooves or slots of varying width depending upon the degree of inclination of the blade. More particularly, the invention relates to improvements in such assemblies of the type wherein inner plates having complementary inclined surfaces are fixedly mounted to either side of a plate-like circular blade and rotatably mounted between a set of arbor-mounted outer plates also having complementary inclined surfaces, the variable inclination of the blade with respect to the arbor being obtained by rotating the inner plates and blade relative to the outer plates. A typical adjustable wobble dado assembly of this type is shown for example in Sam U.S. Pat. No. 3,159,191.

Such adjustable wobble dado assemblies have in the past suffered from major problems of dynamic imbalance caused by the combination of high arbor speed, rotational imbalance caused by loose tolerances and other geometric features needed to facilitate operation of the adjustable inner and outer plate adjustment mechanism, and too much concentration of weight in the blade of the assembly. The resultant dynamic imbalance can cause severe vibration and chattering at higher arbor speeds, defeating smoothness of operation and impairing the maintenance of proper blade adjustment.

One universal feature of all such previous adjustable wobble dado assemblies is that the degree of inclination of the blade is adjusted by rotating the inner plates with respect to the outer plates about cylindrical hubs on the outer plats which extend along an axis tilted with respect to the arbor axis. The adjustable rotational movement of the inner plates about such an axis, which is tilted relative to the axis of rotation of the entire device on the arbor shaft, minimizes rather than maximizes rotational balance of the assembly at all adjustable positions and has been at least partially responsible for the dynamic imbalance and vibration referred to above. However it has previously been considered necessary that the adjustable rotation of the blade and inner plates relative to the outer plates be about a hub extending perpendicular to the complementary inclined inner surfaces of the outer plates, which are always tilted with respect to the arbor axis of rotation, since any other rotational movement would result in binding between the inner and outer plates.

It has also been a problem to maintain a close tolerance between the outside diameter of the outer plate hubs and the inside diameter of the circular bores of the inner plates into which the hubs are inserted so as to permit the inner plates to rotate relative to the outer plates. This is due to the fact that the inner and outer plates are intended to be easily manually rotatable with respect to one another to facilitate variable adjustment of the device by the user. In past practice, the hubs and circular bores have engaged one another throughout substantially the entire width of the inner plates, thereby resulting in a rather large bearing area between the hubs and circular bores. Attempting to maintain a close tolerance over such a large bearing area while at the same time ensuring easy manual rotation of the bores with respect to the hubs has been difficult from the point of view of economical machining. Accordingly a rather large tolerance has usually been provided, permitting the inner plates and blade to become axially decentered (by the amount of the tolerance) with respect to the arbor during adjustment, thereby causing further dynamic imbalance.

Accordingly a need exists for an adjustable wobble dado assembly of the type described which overcomes these problems and thereby provides improved dynamic balance.

SUMMARY OF THE PRESENT INVENTION

The present invention overcomes those deficiencies or prior adjustable wobble dado assemblies described above by providing arbor-mounted outer plates having an arbor shaft bore therethrough and a substantially cylindrical hub surrounding the arbor bore and extending inwardly along the same axis as the arbor bore. The circular bores of the inner plates, into which the hubs extend to permit rotation of the inner plates relative to the outer plates, are inwardly tapered to a greater degree than any inward taper of the hub surfaces, with the result that a greater difference between the hub radius of curvature and the bore radius of curvature exists at a location adjacent the outer surface of each inner plate than at a location adjacent the inner surface of each inner plate. In fact, the radius of curvature of each hub adjacent the inner surface of each inner plate approximates as closely as possible the smallest radius of curvature of the inwardly tapered circular bores so as to provide an exceptionally close tolerance at that location. Because of the inwardly tapered structure of the circular bores, the bearing area between the hubs and the bores is limited to a narrow strip or "land" of bore material at the close-tolerance location, making the close tolerance feasible. More importantly, however, the greater degree of inward tapering of the inner plate circular bores permits them to tilt with respect to the hubs about a "fulcrum" formed at the aforesaid narrow strip of bore material when the inner plates are rotated with respect to the outer plates. This tilting of the circular bores enables the inner plates to rotate about cylindrical hubs which, unlike previous assemblies, extend along an axis coincident with the arbor, despite the fact that the inclined inner surfaces of the outer plate members remain nonperpendicular with respect to the arbor as in previous assemblies.

It is therefore a primary objective of the present invention to provide an adjustable wobble dado assembly of the type described having hubs which permit adjustable rotation of the inner plates and blade with respect to the outer plates about a hub axis coincident with the arbor axis, thereby making possible better rotational balance of the assembly at all adjustable positions.

It is a further objective to provide a bearing area between the hubs and the circular bores of the inner plates which is limited to a narrow bearing surface due to a greater inward taper of the circular bores, thereby permitting a very close tolerance between the hubs and circular bores at such bearing surface and minimizing any tendency of the inner plates and blade to become axially decentered with respect to the arbor during adjustment.

It is a further feature to construct the inner plates and outer plates respectively of a denser material than that of the circular blade so as to maximize the concentration of mass nearer to the arbor axis of rotation and thereby further enhance dynamic balance.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a partial side view of the wobble dado assembly of the present invention shown in a position adjusted for cutting a groove of minimum width.

FIG. 2 is an edge view of the assembly of FIG. 1.

FIG. 3 is an exploded perspective view of the assembly of FIG. 1.

DESCRIPTION OF THE PREFERRED EMBODIMENT

Figure 7:
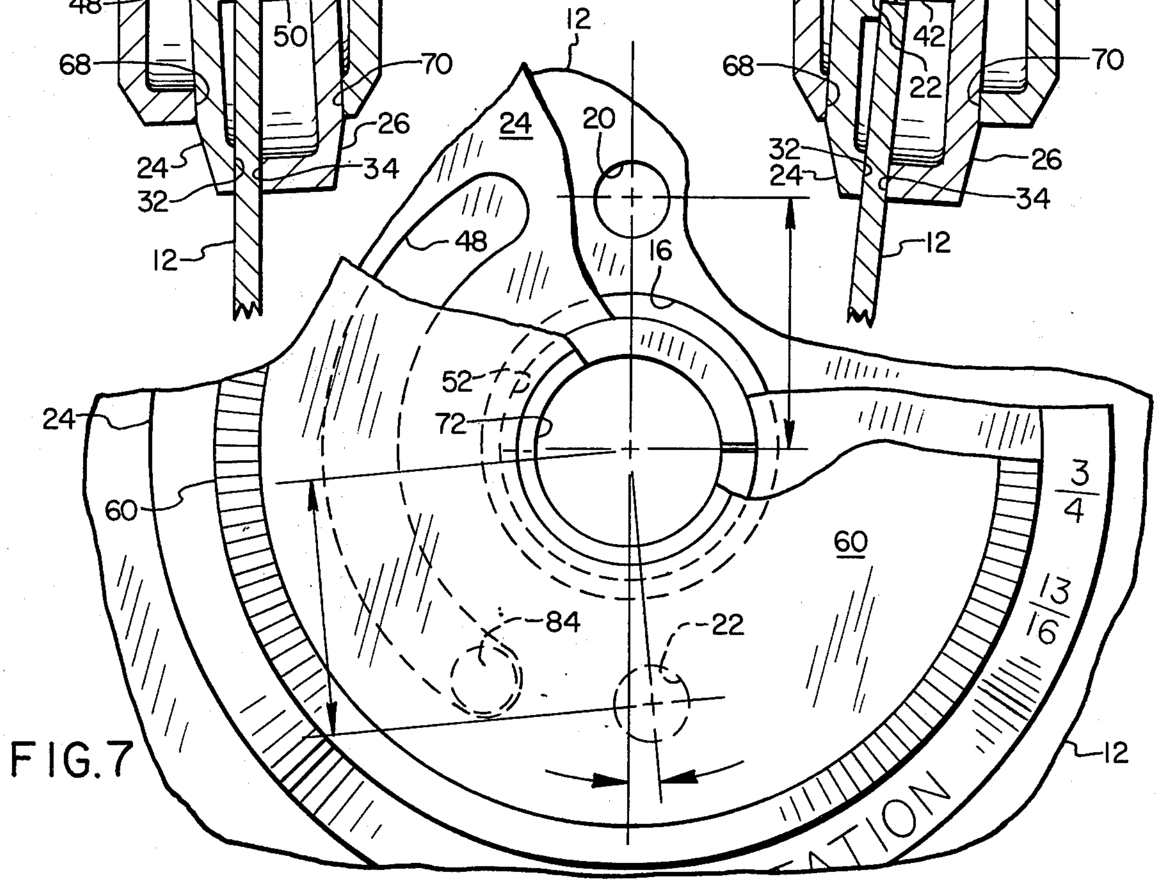
FIG. 7 is a partial side detail view of the dado assembly of FIG. 1, with portions broken away for clarity.

The adjustable wobble dado assembly, indicated generally as 10 in FIGS. 1 and 2, comprises a plate-like circular blade having two opposite side surfaces, a plurality of cutting teeth 14 spaced around its periphery and an aperture 16 formed axially through its center. The teeth 14 of the blade have individual hardened cutting tips 18 attached thereto. The blade 12 has a pair of smaller apertures 20 and 22 formed transversely therethrough on each side of the aperture 16 and radially spaced from one another by an angle other than 180°, as best seen in FIG. 7.

Figure 5:
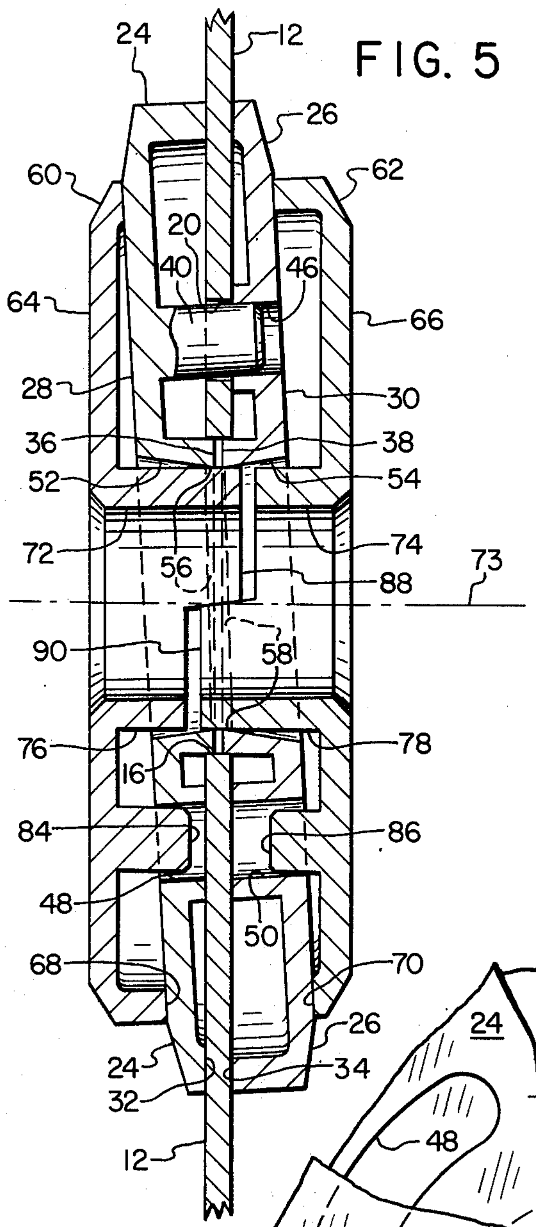
FIG. 5 is a sectional view taken along line 5—5 of FIG. 1.
Figure 6:
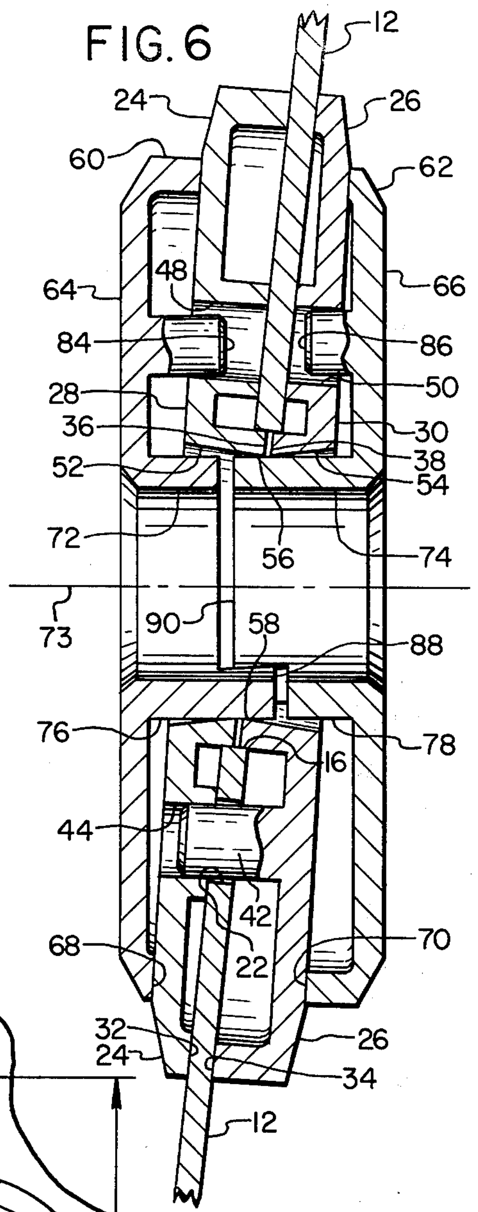
FIG. 6 is a sectional view taken along line 6—6 of FIG. 4.

A pair of circular inner plate members 24 and 26 respectively are fixedly and centrally mounted on opposite sides of the blade. The inner plates 24 and 26 have generally parallel, plane outer surfaces 28 and 30 respectively and complementary parallel inner surfaces 32 and 34 respectively defined by inwardly facing ribs, such inner surfaces being inclined with respect to the other surfaces 28 and 30 respectively and bearing against the sides of the blade 12 so as to hold the blade at a position inclined relative to the outer surfaces 28 and 30. Each of the inner plates has an inwardly protruding circular shoulder 36 and 38 respectively designed to fit snugly within the sawblade aperture 16 as seen in FIGS. 5 and 6. Each inner plate 24 and 26 also has an inwardly protruding pin 40 ad 42 respectively and a mating socket aperture 44 and 46 respectively for accepting the opposing pin 42 and 40 respectively. The pins and holes 40, 42, 44 and 46 are spaced so as to match the spacing of the blade apertures 20 and 22 so that the pins can fit through the blade apertures and engage the mating apertures in the opposite inner plate, as best seen in FIGS. 5 and 6. The purpose of the pins 40 and 42 is to maintain the inner plates in a proper predetermined rotational relationship with the blade 12 and with each other. The radial spacing of the apertures 20 and 22 at an angle other than 180° ensures that the inner plates 24 and 26 respectively can be affixed to the blade 12 in only one arrangement. This is important since the cutting tips 18 are offset laterally with respect to the blade 12 in one direction or the other depending upon the rotational position of the inner plates with respect to the blade to provide both right and left-handed cutting, as is well known to the art. Each of the inner plates 24 and 26 also includes an arcuate slot 48 and 50 respectively for purposes to be described hereafter.

Extending centrally through each inner plate 24 and 26 is a circular bore 52 and 54 respectively along an axis generally normal to the outer surface 28, 30 of the respective inner plate. As seen in FIGS. 5 and 6, each of the circular bores 52 and 54 is tapered inwardly, that is, each has a radius of curvature which gradually decreases in a direction from the outer surface of the respective inner plate toward the inner surface of the inner plate. Moreover, each circular bore includes a respective portion of predetermined narrow width 56 and 58 adjacent to the respective inner surface 32 nd 34 and having a uniform radius of curvature equal to the smallest radius of curvature of the respective circular bore, thereby forming a narrow "land" or bearing surface for rotatably contacting the hub of a respective outer plate to be described hereafter.

A pair of interconnected circular outer plate members 60 and 62 respectively are provided having parallel plane outer surfaces 64 and 66 respectively and complementary parallel inner surfaces 68 and 70 respectively defined by inwardly projecting ribs as shown in FIG. 3, the inner surfaces 68 and 70 being inclined with respect to the outer surfaces 64 and 66 respectively and bearing rotatably against the respective outer surfaces 28 and 30 of the inner plate members 24 and 26. Each of the outer plates 60 and 62 has an arbor bore formed centrally therethrough along an axis 73 normal to the respective outer surface 64, 66 of the outer plate. The arbor bore is sized to fit snugly around a saw arbor shaft (not shown). Surrounding each arbor bore 72 and 74, and extending centrally from the respective inner surface of the outer plate inwardly into a respective one of the circular bores 52, 54 of the inner plates 24, 26 is a substantially cylindrical hub 76 and 78 respectively. The extended ends of the hubs mating interlocking portions 88 and 90 respectively for interconnecting the outer plates in fixed relationship to one another as best seen in FIGS. 5 and 6. The outer surface of each hub may be of a straight, untapered cylindrical configuration as shown in the figures, or of a slightly inward tapering configuration. In any case, the outside radius of curvature at locations along the length of each hub is smaller than the corresponding radius of curvature at the same location of the circular bore 52 or 54 into which the hub extends. As seen in FIGS. 5 and 6, each hub extends along precisely the same axis 73 as the respective arbor bores 72 and 74, and therefore extends normal to the outer surfaces 64 and 66 of the outer plates rather than normal to the inner surfaces 68 and 70 of the outer plates. Regardless of whether the hub is of straight cylindrical or slightly tapered cylindrical configuration, it is critical that the circular bores 52 and 54 of the inner plates 24 and 26 respectively be tapered inwardly to a greater degree than the outer hub surfaces so that the difference between the hub radius of curvature and the circular bore radius of curvature at locations along the length of the circular bore is greater at a location adjacent the respective outer surface 28, 30 of the inner plate than at a location adjacent the respective inner surface 32, 34 of the inner plate in the region of the narrow "lands" 56 and 58. This relationship is clearly seen in FIGS. 5 and 6 wherein a large difference, between the inside diameter or radius of curvature of the circular bores 52 and 54 and the outside diameter or radius of curvature of the hubs 76 and 78, exists along the plane of abutment between each inner plate and outer plate. In contradistinction, a very close tolerance exists between the inside diameter or radius of curvature of the circular bores 52 and 54 and the outside diameter or radius of curvature of the hubs 76 and 78 in the region of the narrow lands 56 and 58, which constitute the actual bearing surfaces between the hubs 76 and 78 and the circular bores 52 and 54.

The significance of the particular axis of the hubs 76 and 78, and the variable difference between their outside radius of curvature and the inside radius of curvature of the circular bores 52 and 54, can be seen by examining the movement of the assembly as the blade is adjusted from one inclination to another to provide variable-width groove cutting. As seen in FIGS. 1 and 5, the blade 12 and inner plates 24 and 26 are in a particular rotational position with respect to outer plates 60 and 62 which are mounted on a saw arbor shaft (not shown) extending through arbor bores 72 and 74. Conventional releasable clamping means (not shown) are mounted on the saw arbor on either side of the outer plates to hold the entire assembly firmly on the arbor shaft. In the position of the assembly shown in FIGS. 1 and 5, the blade 12 is normal to the arbor shaft axis 73 and therefore is capable of cutting a groove of minimum width. This fact is indicated by the alignment of a pointer 80 on the edge of the outer plate 60 with a minimum groove width dimension "3/16" inscribed as part of a scale 82 along the periphery of the inner plate 24. The position of the assembly in FIG. 1 also represents one limit of the rotational relationship between the outer plates 60 and 62 and the inner plates 24 and 26, because a pair of pins 84 and 86 protruding inwardly from the outer plates 60 and 62 respectively and riding within the arcuate slots 48 and 50 formed in the inner plates 24 and 26 abut against one end of the slots. As seen in FIG. 5, the circular bores 52 and 54 of the inner plates 24 and 26 are inclined in a particular tilted position with respect to the hubs 76 and 78 when the assembly is in the adjustable position of FIG. 1.

Figure 4:
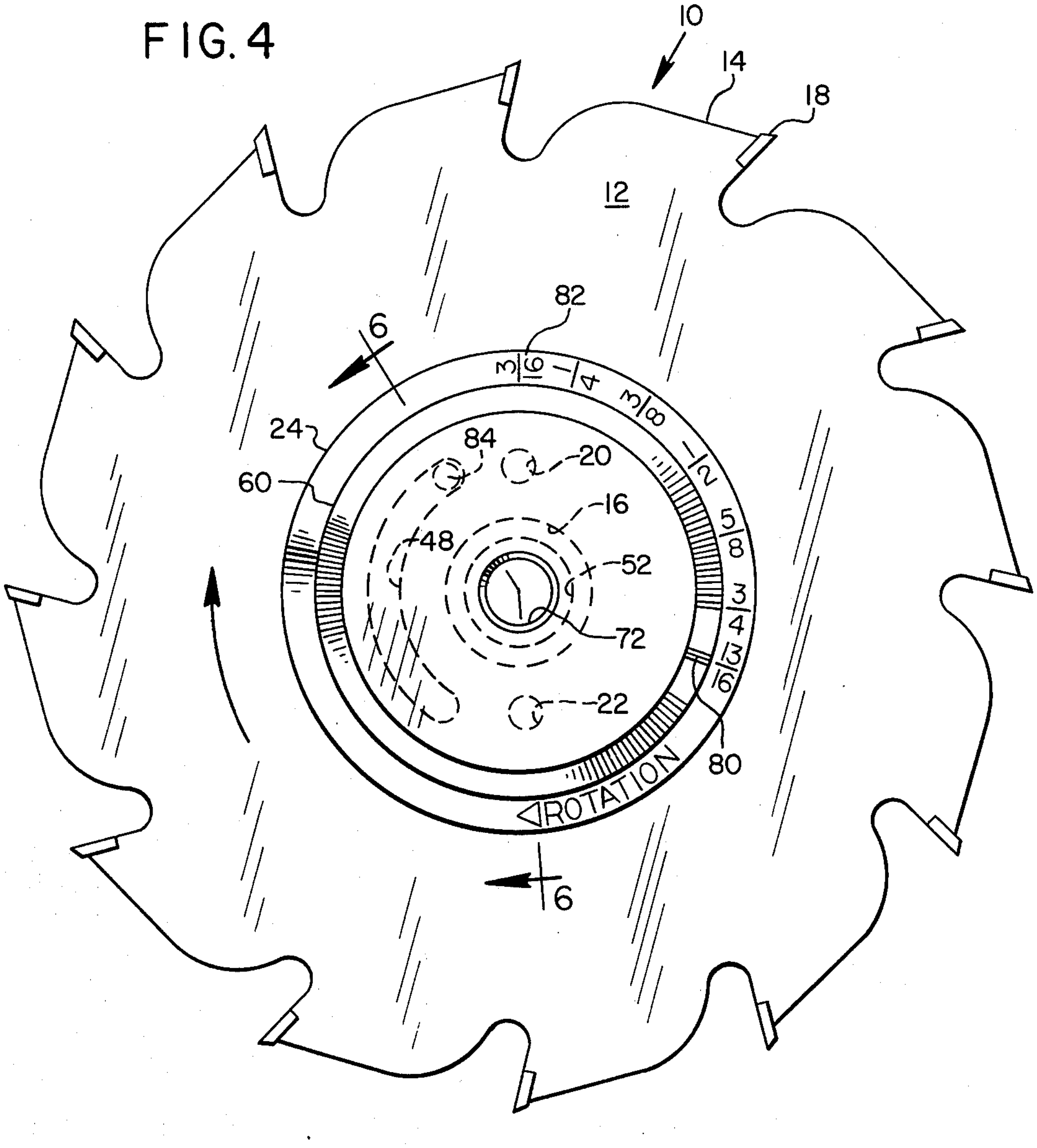
FIG. 4 is a side view of the dado assembly shown in an adjusted position for cutting a groove of maximum width.

With reference to the different adjustable position of the assembly shown in FIGS. 4 and 6, it will be seen that relative rotational movement has occurred between inner plates 24 and 26 and the outer plates 60 and 62 such that the pointer 80 on the outer plates 60 now points to the maximum groove width dimension "13/16" on the scale 82. This represents the opposite limit of rotational relationships of the inner and outer plates by the position of the pin 84 at the opposite end of the slot 48 as shown in FIG. 4. In this position the blade 12 is inclined with respect to the arbor axis 73 and the circular bores 52 and 54 of the inner plates are in a substantially different tilted position with respect to the hubs 76 and 78.

The difference in tilting position of the circular bores 52 and 54 with respect to the hubs 76 and 78, necessitated by the relative rotation of the inner and outer plates with respect to one another, is permitted by the above-described greater degree of inward taper of the circular bores and the lesser degree (if only) of inward taper of the hubs, permitting the circular bores 52 and 54 to tilt about a "fulcrum" provided by the narrow, close-tolerance bearing lands 56 and 58 which are the only surfaces of contact between the circular bores and the hubs. Such "fulcrumed" movement of the circular bores 52 and 54 with respect to the hubs 76 and 78 is necessitated by the fact that the hubs extend along the same axis 73 as the arbor bores 72 and 74, rather than along an axis normal to the inner surfaces 68 and 70 of the outer plates and the outer surfaces 28 and 30 of the inner plates. Moreover the small bearing surface between the circular bores and hubs provided by the lands 56 and 58 allow a very close tolerance between the hubs and lands without impairing the ease of manual rotation of the inner plates relative to the outer plates, thereby minimizing any tendency of the inner plates and blade to become axially decentered with respect to the arbor axis 73 during variable adjustment of the assembly.

Preferably both the inner plates 24 and 26 and the outer plates 60 and 62 are constructed of a metal such as zinc which has a higher specific gravity than the steel material of which the circular blade 12 is composed. This feature maximizes the concentration of mass nearer to the arbor axis 73 and thereby further enhances dynamic balance of the assembly at its various adjustable positions.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An adjustable wobble dado assembly comprising:

a. a plate-like circular blade having two opposite side surfaces, a plurality of cutting teeth spaced around its periphery and means defining an aperture formed axially through its center;

b. a pair of inner plate member, fixedly and centrally mounted on opposite sides of said blade, having generally parallel outer surfaces and complementary inner surfaces inclined with respect to said outer surfaces and in contact with said blade for holding said blade at a position inclined relative to said outer surfaces, each of said inner plate members having means defining a circular bore formed centrally and axially through said inner plate member, each of said bores being tapered so as to have a radius of curvature gradually decreasing in a direction from said outer surface toward said inner surface; and c. a pair of interconnected outer plate members, having generally parallel outer surfaces and complementary inner surfaces inclined with respect to said outer surfaces of said outer plate members and bearing rotatably against said respective outer surfaces of said inner plate members, each of said outer plate members having means defining an arbor bore formed centrally through said outer plate member along an axis generally normal to the outer surface thereof and a substantially cylindrical hub surrounding said arbor bore and extending centrally from said inner surface of said outer plate member into a respective one of said circular bores along the same axis as said arbor bore, each of said cylindrical hubs having an outside radius of curvature at locations along the length thereof which is smaller than the corresponding radius of curvature at the same location of the circular bore into which the hub extends, the difference between said hub radius of curvature and said circular bore radius of curvature being greater at a location adjacent the outer surface of said inner plate member than at a location adjacent the inner surface of said inner plate member so as to permit tilting of said circular bore with respect to said hub about said location adjacent the inner surface of said inner plate member when said circular bore and hub are rotated relative to one another.

2. The dado assembly of claim 1 wherein said circular bore of each of said inner plate members includes a portion of predetermined narrow width adjacent said inner surface of said inner plate member having a uniform radius of curvature equal to the smallest radius of curvature of said circular bore.

3. The dado assembly of claim 1, further including means interacting between said outer plate members and said inner plate members for limiting, by a predetermined amount, the degree of rotation between said outer plate members and said inner plate members.

4. The dado assembly of claim 1 wherein said inner and outer plate members respectively are composed of a material having a higher specific gravity than the material of said circular blade.

* * * * *

UNITED STATES PATENT AND TRADEMARK OFFICE
CERTIFICATE OF CORRECTION

PATENT NO. : 4,055,204

DATED : October 25, 1977

INVENTOR(S) : Fred G. Gunzner, Dale Edwards and John A. Lanning

It is certified that error appears in the above-identified patent and that said Letters Patent are hereby corrected as shown below:

Col. 1, line 39 Change "plats" to --plates--.

Col. 3, line 46 Change "other" to --outer--.

Col. 4, line 40 after "hubs" add the word --have--.

Col. 5, line 50 Change "relationships" to --relationship--;

line 62 Change "(if only)" to --(if any)--.

Col. 6, line 35 Change "member" to --members--.

Signed and Sealed this

*Thirtieth* Day of *May 1978*

[SEAL]

*Attest:*

RUTH C. MASON
*Attesting Officer*

LUTRELLE F. PARKER
*Acting Commissioner of Patents and Trademarks*